Feb. 13, 1934.  F. X. MUENZER  1,946,708
MACHINE FOR MAKING BUILDING BLOCKS
Filed April 27, 1931   6 Sheets-Sheet 1

Inventor
Frank X. Muenzer
By Owen & Owen
Attorneys

Feb. 13, 1934.   F. X. MUENZER   1,946,708
MACHINE FOR MAKING BUILDING BLOCKS
Filed April 27, 1931   6 Sheets-Sheet 4

Inventor
Frank X. Muenzer
By Owen & Owen
Attorneys

Feb. 13, 1934.  F. X. MUENZER  1,946,708
MACHINE FOR MAKING BUILDING BLOCKS
Filed April 27, 1931   6 Sheets-Sheet 5
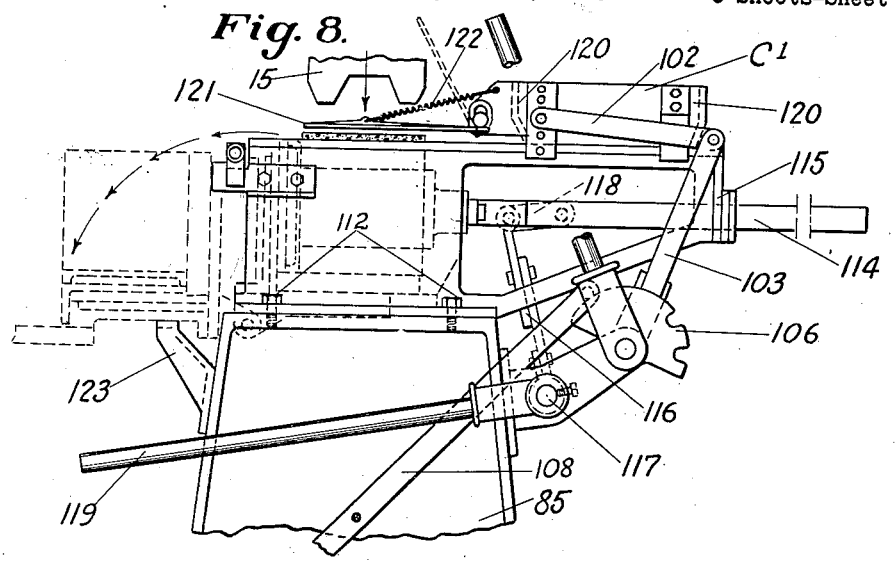
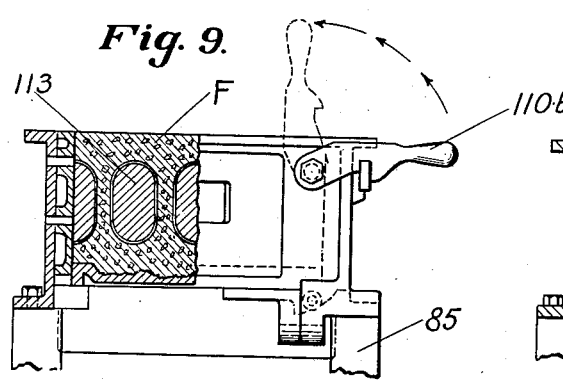
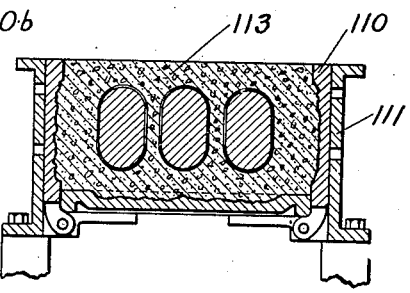
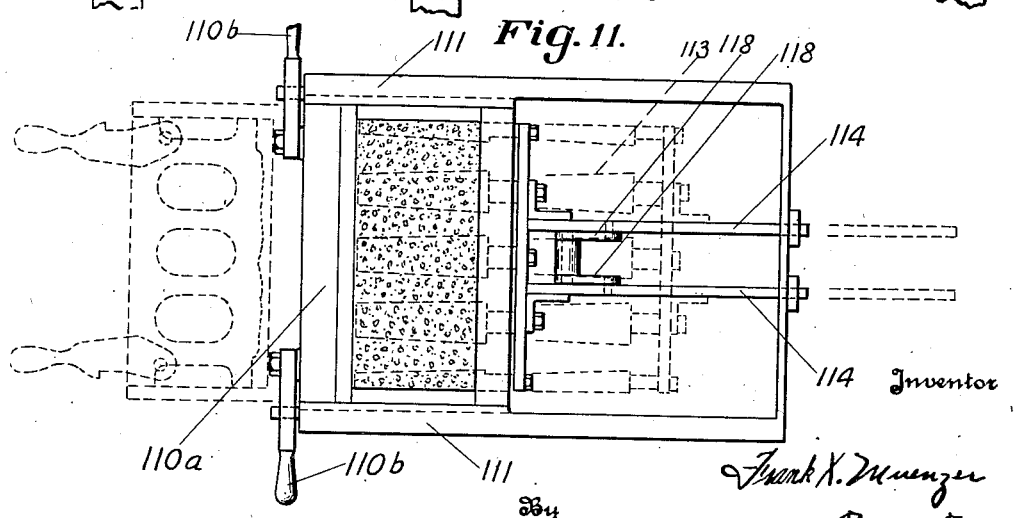

Feb. 13, 1934.   F. X. MUENZER   1,946,708
MACHINE FOR MAKING BUILDING BLOCKS
Filed April 27, 1931   6 Sheets-Sheet 6

Inventor
Frank X. Muenzer
By Owen & Owen
Attorneys

Patented Feb. 13, 1934

1,946,708

UNITED STATES PATENT OFFICE 1,946,708

MACHINE FOR MAKING BUILDING BLOCKS

Frank X. Muenzer, Elmore, Ohio, assignor to The Multiplex Concrete Machinery Company, Elmore, Ohio, a corporation of Ohio Application April 27, 1931. Serial No. 533,021

10 Claims. (Cl. 25—41)

This invention relates to concrete block machines and an object is to produce a new and improved machine which operates automatically to feed material to the molds and tamps the material after each charge.

Another object is to produce a machine of this character in which the tamping and charge-forming mechanisms may be readily controlled so that a predetermined number of charges are delivered to the molds whereupon the charging mechanism is automatically rendered inoperative.

A further object is to provide a machine of this character with means for delivering a final or finishing blow to the material in the mold.

A still further object is to so coordinate the operation of the tamping and charge-forming mechanisms that they at all times operate in the proper sequence.

A still further object is to enable the various mechanisms to be readily and conveniently controlled as desired.

A still further object is to provide a machine of the above character with a stationary base on which different molds may be detachably mounted.

Other objects and advantages will hereinafter appear and for purposes of illustration but not of limitation an embodiment of the invention is shown on the accompanying drawings, in which—

Figure 1:
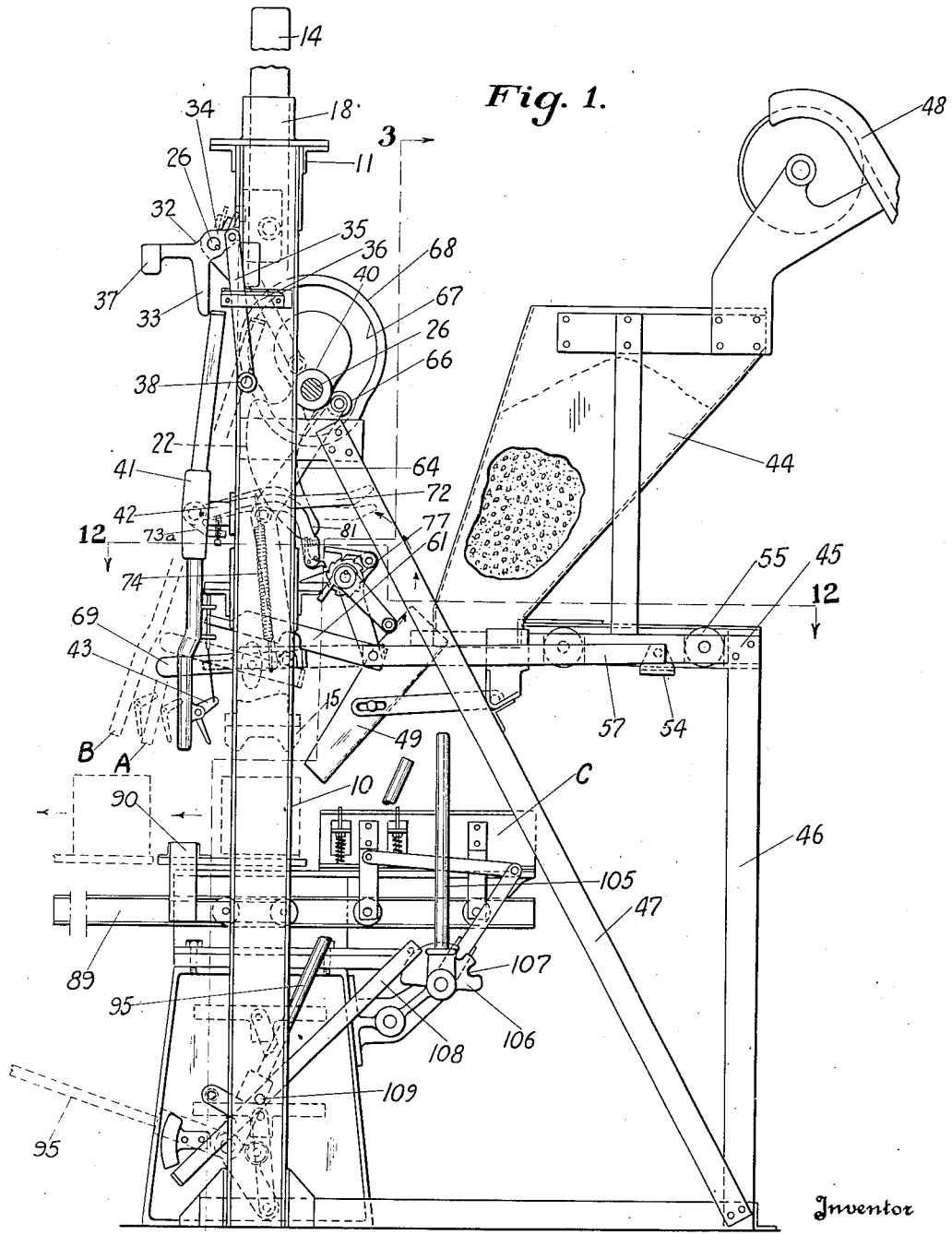
Fig. 1 is a side elevation of a cement block molding machine.
Figure 2:
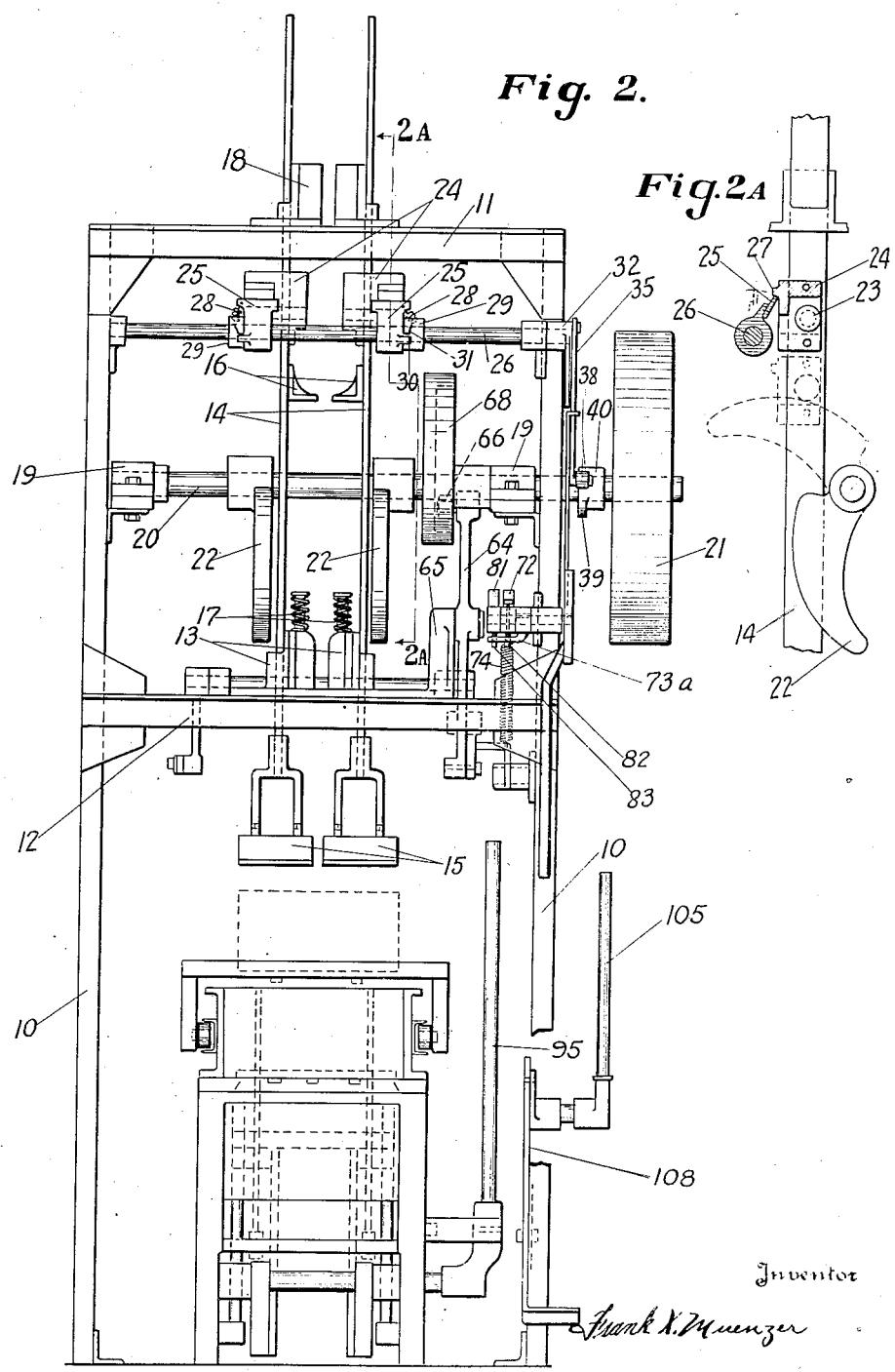
Fig. 2 is a front elevation of the machine shown in Fig. 1.
Figure 3:
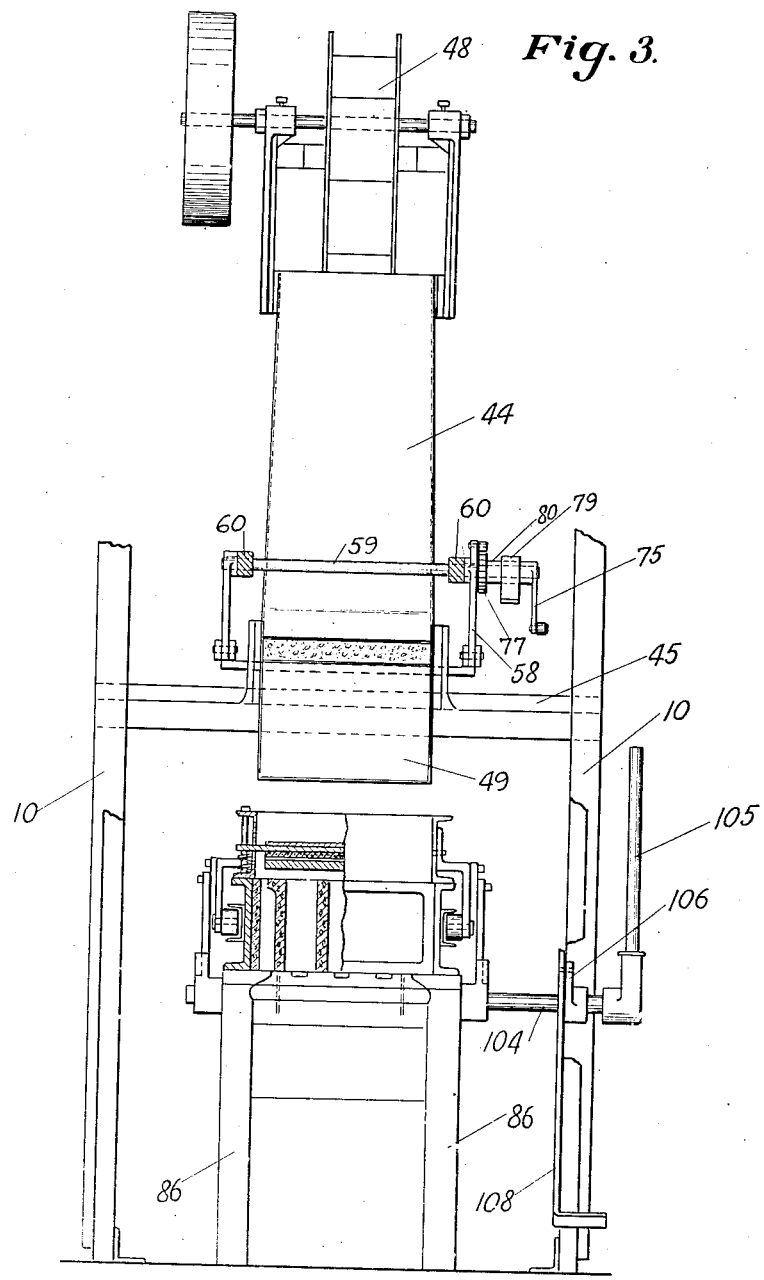
Figure 4:
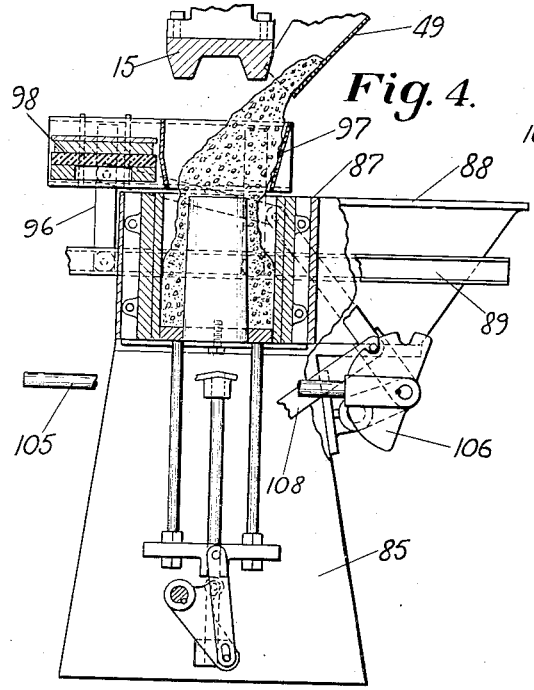
Figure 5:
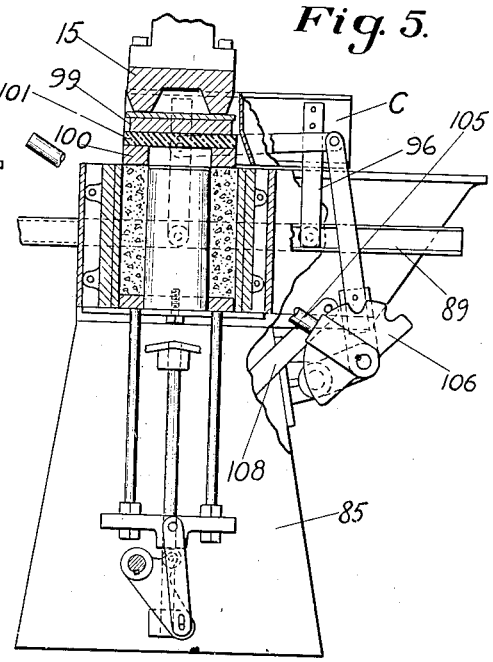
Figure 6:
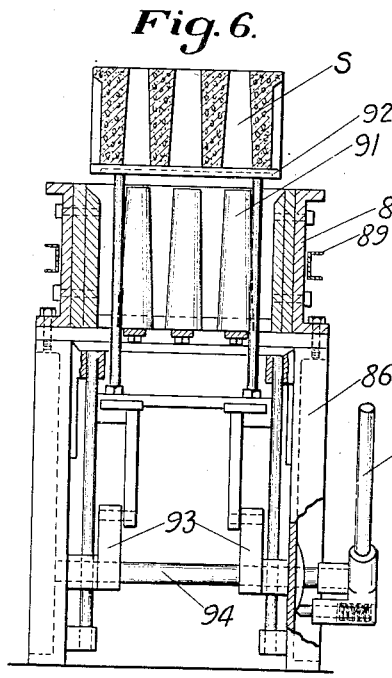
Figure 7:
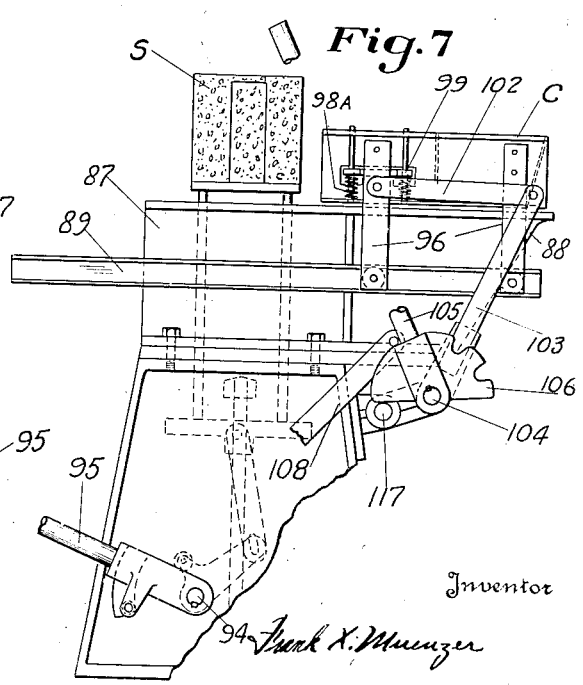
Figure 12:
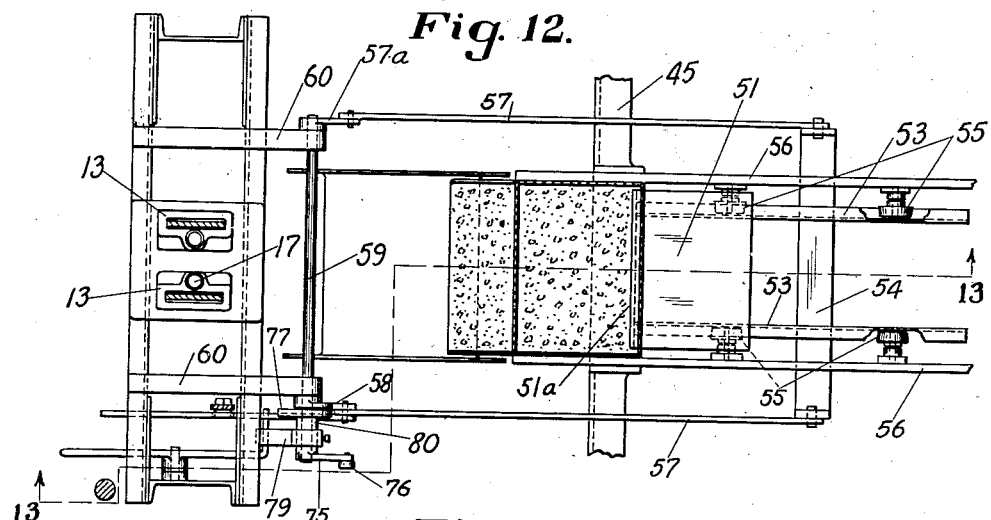
Figure 13:
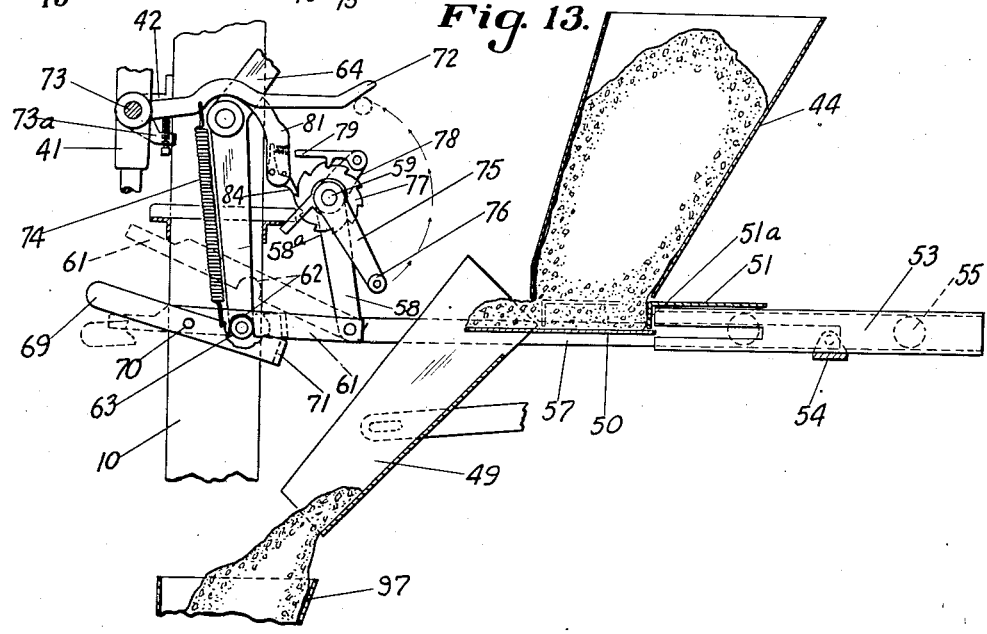

Fig. 2ᵃ is a vertical sectional view on the line 2ᵃ—2ᵃ of Fig. 2;

Fig. 3 is a vertical sectional view on the line 3—3 of Fig. 1;

Fig. 4 is an elevation partly in section of the base and stripper block mold, showing a charge of material being inserted;

Fig. 5 is a view similar to Fig. 4 but with the tamping device over the mold box;

Fig. 6 is an end view of the base and mold box showing the finished block ejected;

Fig. 7 is a side elevation of the parts shown in Fig. 6;

Fig. 8 is a fragmentary side elevation of the face-down block mold equipment,

Fig. 9 is an elevation partly in section of the mold for the face-down block and associated parts;

Fig. 10 is a sectional elevation of the face-down block mold;

Fig. 11 is a top plan view of the face-down mold equipment;

Fig. 12 is a transverse section on the line 12—12 of Fig. 1 showing the charge-forming mechanism; and Fig. 13 is a vertical sectional view on the line 13—13 of Fig. 12.

The illustrated embodiment of the invention comprises a machine for making concrete blocks having a frame provided with vertically disposed channel beams 10 connected at their upper ends by a cross bar 11. Beneath the cross bar 11 is a cross bar 12 connecting the side beams 10, and mounted on the cross bar 12 is a pair of horizontally adjustable wear-take-up blocks or tamp-aligning guides 13 in which reciprocate tamping bars 14 having weighted tamping heads 15 at their lower ends. Lugs 16 are connected to the tamping bars 14 and are adapted to strike against the spring bumpers 17 mounted on the guides 13 to limit the downward movement of the tamping bars. The upper ends of the tamping bars 14 extend through guides 18 mounted on the upper cross bar 11.

As shown by dotted lines in Fig. 1 and full lines in Fig. 8, the lower ends of the tamping head 15 are provided with laterally spaced legs or projections, the inner walls of which incline outwardly and the outer walls of which incline inwardly. These projections have blunt tamping noses with an intermediate tamping surface. The purpose of so forming the heads is to initially tamp the material on the side portions of the mold in order to make more dense the outer or load-bearing surfaces of the block. As will hereinafter appear, the tamping heads operate successively after each charge is delivered to the mold box and the successive tamping action by heads formed in this manner provides a more compact and dense outer surface than the inner surface of the block.

Disposed in the space between the cross bars 11 and 12, and journalled in bearings 19 is a shaft 20 having a drive wheel 21 outside the machine frame, which may be driven from any suitable source of power. Secured to the shaft 20 at one end are cam arms 22, one being provided for each tamping bar 14. The arms 22 are adapted to intermittently engage rollers 23 carried by brackets 24 fixed to the tamping bars 14 to lift the bars 14 a predetermined distance and then release them, allowing them to drop by gravity to effect the tamping operation.

In order to hold the tamping bars 14 in raised position to prevent tamping operation, a pair of latch blades 25 is loosely mounted on a transverse shaft 26. One blade 25 is provided for each bracket 24, and formed on the brackets respectively are lugs 27, against which the blades 25 are adapted to engage. When the parts are in the position shown in Fig. 2ª, the bars 14 will be retained in raised position. The latch blades 25 are urged by a relatively weak spring 28 toward a collar 29 carried by the shaft 26, and stop lugs 30 and 31 on the blade and collar respectively limit the movement of the blades with respect to the collar 29.

Secured to an outer end portion of the shaft 26 is a bell crank lever 32. The long arm 33 of the bell crank extends downwardly, and the short arm 34 is pivotally connected to an arm 35, which loosely depends therefrom and is guided by a plate 36. A weight arm 37 connected to the bell crank 32 is adapted to balance or compensate for the weight of the latch plates 25 and associated parts.

A roller 38 on the free end of the arm 35 is adapted to be moved into the path of movement of a lug 39 which is formed on a collar 40 secured to the shaft 20. The purpose of the lug 39 is to engage the roller 40 and impart counter clockwise movement to the shaft 26 (Fig. 1), thereby to throw the latch blades 25 out of latching position.

An operating or control lever 41 is provided for moving the arm 35 to such position that the roller will be engaged by the lug 39. The arm 41 is pivoted intermediate its ends to a bracket 42 carried by one of the vertical beams 10. The upper end of the arm 41 is engageable with the depending arm 33 of the bell crank 32. Movement of the lever 41 in clockwise direction (Fig. 1) operates to move the arm 35 to operative position. When the operating lever 41 is in the full line position shown in Fig. 1 the latches 25 are disposed in latching position with the upper end of the lever 41 providing a stop limiting the counter clockwise movement of the bell crank 32 (Fig. 1).

When the operating lever 41 is in the dotted line position A of Fig. 1, the latches 25 are still in latching position, the arm 34 not being moved sufficient to be engaged by the lug 39. However, movement of the operating lever 41 to dotted line position B of Fig. 1 actuates the arm 35 into the proper position to be engaged by the lug 39, which at the proper time releases the latches 25, thereby allowing the tamping heads 15 to descend or drop by gravity. A suitable catch mechanism 43 is carried by the operating lever 41 to retain it in the desired position of adjustment.

As will hereinafter appear, the molds for the material to be tamped are disposed beneath the tamping heads 15, and the material such as concrete to be fed to the molds is placed in a hopper 44 mounted on a frame 45 supported by legs 46. Diagonal frame supports 47 cooperate in supporting the hopper and associated parts. The material is elevated to the hopper by conveyor 48 of any suitable type. From the hopper 44 the material is delivered to a chute 49, which is arranged slightly beneath and in front of the hopper.

A platform 50 is spaced vertically from the lower end of the hopper 44, and the front end thereof extends a short distance into the chute 49. Reciprocable in the space between the platform 50 and the lower end of the hopper 44 is a slide or ram 51 having a vertically disposed front face or flange 51ª, which forces or scrapes a quantity of material disposed on the platform 50 into the chute 49, from which the material passes to a mold hopper or receiver 97 disposed beneath the tamping heads 15, as will hereinafter be more fully described.

The horizontal portion of the slide 51 in its forward or advancing movements provides a stop for the material in the hopper 44, thereby preventing additional material from dropping upon the platform 50. The slide 51 is secured to a pair of parallel horizontally disposed channel bars 53, which are secured to a transverse bar 54. Reciprocating movement of the slide 51 is guided by a series of rollers 55, which engage in the channel bars 53. The rollers are carried by parallel side frame members 56 and extend along opposite sides of the platform 50.

The cross bar 54 associated with the feed slide 51 is pivotally connected at opposite sides by links 57 to a lever 57ª which is fixed to shaft 59 at one end to an arm 58 of a bell crank 58ª fixed to and depending from a transverse shaft 59, which is mounted in brackets 60 carried by the main frame of the machine. Pivotally connected to one of the links 57 is an arm 61 having a groove 62 formed therein. A roller 63 carried by a bell crank lever 64 is adapted to extend into the groove or notch 62, and rocking movements of the bell crank 64 impart reciprocatory movements to the slide 51 through the connections described. The bell crank 64 is pivoted to a bracket 65 mounted on the cross bar 12. Mounted on the opposite end of the bell crank 64 is a roller 66 (Figs. 1 and 2), which is disposed in a cam groove 67 formed in a disk 68. The disk 68 is secured for rotation to the shaft 20.

The above described mechanism is so constructed and arranged that a charge of material is forced from the platform 50 by the slide 51, and thereafter the tamping heads 15 are released from their elevated position and allowed to drop, thereby tamping the previously delivered charge into the mold. The purpose of the above described control for the tamping bars 14 is so that they cannot be released before a charge of material is delivered to the mold, thereby preserving the timing or co-ordination of the material feed and tamping mechanism.

The arrangement is such that a series of charges of material is successively forced from the hopper to the chute, and thereby to the mold, and after each charge has been delivered to the mold the tamping heads 15 are released for pressing or tamping the material in the mold, thereby to obtain a more dense mass in the mold. The charge feeding mechanism is so constructed and arranged that after a predetermined number of charges are delivered such mechanism is rendered inoperative until again placed into operation by the operator. One control for the charge feeding mechanism is an operating lever 69, which is pivoted at 70 to a vertical beam 10, and is provided with a flanged end 71 engageable with the underside of the actuating arm 61. When the operating lever 69 is depressed the arm 61 is lifted out of engagement with the roller 63 so that continued oscillation of the bell crank 64 does not impart operative movements to the material slide 51.

Control of the material feeding mechanism may also be had by the main operating lever 41, as will hereinafter be described. As shown in Fig. 13, an arm 72 has one end pivoted to a shaft 73 to which the lever 41 is secured. Fixed to the shaft 73 is a bracket 73ª having a set screw 82 engaging the underside of the arm 72. The arm 72 is connected to the control lever 69 through a relatively stiff spring 74. It is apparent that when the main control lever 41 is in the full line position of Fig. 1, the arm 72 will have been rocked in a counter clockwise direction sufficient to lift the inner end of the control lever 69 a sufficient distance so that the notch or groove 62 is clear of the roller 63.

From an inspection of Fig. 1 it will be clear that when the main control lever 41 is moved from the full line position to the dotted line position A the arm 72 is rocked in a clockwise direction (Fig. 13) to allow the actuating arm 61 to drop by gravity into operative relation to the roller 63. However, in this position, as above explained, the tamping heads 15 are retained in elevated position so that the material may continue to be fed from the hopper 44, but no tamping operation takes place. It will further be apparent that when the main control lever 41 is in the dotted line position B of Fig. 1 not only will the actuating arm 61 be allowed to move into operative position thereby imparting feeding action to the slide 51, but also, as above pointed out, the tamping heads 15 will be allowed to move vertically to effect the tamping operation, this movement being co-ordinated with the charge feeding action in accordance with the manner heretofore explained.

Mechanism is provided to afford feeding of a predetermined number of charges from the hopper 44, and thereafter the feed is automatically rendered inoperative, although the tamping operation continues. For this purpose an arm 75 having a roller 76 is rotatable with a ratchet wheel 77, which is free to turn on the shaft 59. Pivoted to the short arm 78 of the bell crank 58ᵃ is a dog 79 engageable with the ratchet wheel 77. As the slide 51 and associated parts reciprocate to impart feeding of the material from the hopper 44 the dog 79 likewise reciprocates relatively to the ratchet wheel 77, and for each reciprocation of the feeding slide 51 the dog 79 is moved to the next succeeding notch, thereby progressively rotating the ratchet wheel 77 in a counter clockwise direction (Fig. 13). This operation continues until the roller 76 on the arm 75 engages the underside of the arm 72, and moves it upwardly sufficiently so that the slide actuating arm 61 is disengaged from the roller 63 through the control lever 69 and spring 74. The feed is thus rendered inoperative until the control lever 69 or the main operating lever 41 is actuated to return the slide actuating arm 61 to operative position.

As shown in Fig. 12, the arm 75, ratchet wheel 77 and a stop arm 79 are mounted on a sleeve or bushing 80, which is free to turn on the shaft 59. The arm 75 and ratchet wheel 77 are fixed to the sleeve 80. The stop arm 79 is in frictional contact with the sleeve, but may turn relatively to it. The end of the stop arm 79 is adapted to abut against a part of the machine frame to limit the downward swinging movement of the arm 75 so as to prevent the latter from interfering with the associated mechanism. The number of feeding movements of the slide 51 may be determined by adjusting the position of the arm 75 closer to or farther away from the release arm 72, the closer the arm 75 is set relative to the arm 72 the less number of feeding movements will be imparted to the slide 51.

For preventing clockwise movement of the ratchet 77 (Fig. 13) during the material feeding operation an arm 81 is pivoted at one end to the shaft 73, a set screw 83 on the bracket 73ᵃ engaging the underside of the arm 81 for normally preventing downward swinging movement thereof. Pivoted to the outer end of the arm 81 is a spring pressed pawl 84, which engages the ratchet wheel 77 to prevent retrograde movement thereof during the charge forming operation. As shown in Fig. 1, when the main operating lever 41 is in full line position the arm 81 will have been moved away from the ratchet wheel 77, thereby enabling the arm 75 to be adjusted to the position desired in accordance with the required number of charge forming operations.

An important advantage of this machine is that a single tamping may be imparted to the material in the mold, and this is particularly useful in exerting a final tamping blow on the material after the mold is completely filled. In order to accomplish this result with the above described mechanism, the main operating lever 41 should be thrown to the dotted line position B in Fig. 1 in which normally the feed and tamping mechanisms are rendered operative and co-ordinated in the above described manner. In order to discontinue the feeding operation the operator moves the control lever 69 in order to swing the slide actuating arm 61 out of operative position. Thus by holding the control lever in the position B to exert a single tamping operation, and at the same time moving the operating lever 69, the final tamping blow may be obtained. Thereafter the lever 41 should be moved to full line position in Fig. 1, in which both the feeding and tamping mechanisms are disconnected.

Heretofore in the manufacture of concrete blocks it has been necessary to provide several machines, one for making one type of block and another for making another type. So far as I am aware no machine has been devised which can be used for making the two standard types of blocks, one known as the stripper block and the other known as a down face block. An important characteristic of this invention resides in the provision of a stationary base or mounting on which different molds may be detachably mounted as desired. Thus, in the comparatively short period of time the machine can be adapted for one kind of block or for the other, utilizing the same tamping and charge-forming mechanism.

Figures 4 to 7 inclusive, show the stripper block mold and associated mechanism. The stationary base 85 is utilized in this instance for both the stripper block and the face block molds and is of a rigid structure composed of a pair of side members which taper inwardly from the lower end. For making the stripper block a molding unit is mounted on the base 85 to which it may be detachably connected by stud bolts. In this instance the stripper block unit comprises a mold box 87 having a lateral extension 88 on opposite sides of which are channel members or tracks 89. The tracks 89 are disposed horizontally and extend along the sides of the mold box 87 as far as desired from the mold box.

As indicated in Fig. 1 a carrier 90 may engage the tracks 89 and receive the finished block and carry it to the place desired. Stripper block molds of the type indicated at 87 are well known in the art and detailed description thereof will not be given, except to point out the mold box is provided with a series of vertical cores 91 to provide the finished block S, as shown in Fig. 6, with a plurality of lateral openings. For providing a removable bottom for the mold box is a pallet 92 which is movable vertically to eject the finished block S through cranks 93 mounted on a transverse shaft 94 and the base 85, to which the handle 95 is connected for operating the ejecting mechanism.

A combined filling hopper and finishing tamp unit C is supported on legs 96, which have rollers traveling in tracks 89. On the rearward part of the unit C is a hopper 97 into which material from the chute 49 passes. The hopper 97 is adapted to be placed directly over the mold box 87 so that material may be guided by the hopper 97 directly therein. It will be observed that the hopper 97 is of sufficient size to admit the tamping heads 15 so that while the hopper is in position of use, the tamping heads 15 may be operated to compress the material into the mold box.

After the mold box 87 has been filled the unit C is moved to the right (Fig. 5) to position the tamping device 98 directly over the mold. A slight space is provided between the bottom of the tamping device 98 and the top of the mold so as to allow the material in the mold to project slightly thereabove. The tamping device 98 comprises the top plates 99, preferably of metal, and a lower plate 100 shaped to correspond to the mold construction, and an intermediate pad 101 of yieldable material, as rubber.

When the mold is filled and in order to provide a finished smooth appearance to the end of the block, the tamping device 98 is moved to the position indicated in Fig. 5, whereupon a final tamping blow is imparted to the block through the tamping device, the force of this blow being slightly cushioned by the rubber pad 101. Coil springs 98a disposed on the outside of the unit C serves to yieldingly retain the parts of the tamping device in the desired position.

For imparting shifting movement to the unit C a link 102 is pivoted to one of the forward legs 96, and this link is connected by a link 103 to a shaft 104 which may be actuated by a lever 105. As shown in Fig. 1 a quadrant 106 is fixed for movement to the lever 105 and formed in the periphery is a series of grooves 107 into which a pin on the end of an arm 108 is adapted to drop to retain the unit C in the desired position. The arm 108 is pivoted at 109 to the machine frame. When it is desired to release the latch arm 108 this may be accomplished by depressing the free end to disengage the pin from the quadrant 106 to enable the lever 105 to be moved in the manner desired.

If it is desired to change from the stripper block mold to another form of mold, it is merely necessary to remove the stud bolts securing the mold box 87 to the base 85 to disconnect the link 102 whereupon the mold box and associated mechanism may be bodily lifted from the base 85 to make way for a different type of mold.

As shown in Figs. 8 to 11, the face-down mold box may readily be mounted on the base 85 to replace the stripper block mold. Ordinarily the face-down block mold such as indicated in Figs. 8 to 11 is provided with hingedly mounted sides 110 disposed within an outer shell 111 forming the outside of the mold box. Closing one side of the mold box is a plate 110a which is held in position by latches 110b connected to the shell. The shell 110 is secured to the base 85 by stud bolts 112. Removable cores 113 extend transversely into the mold box and as will be apparent, are first removed after the block is cast. For removing the cores 113, bars 114 are connected to the cores and are guided by a bracket 115. An arm 116 is fixed to a transverse shaft 117 and is pivotally connected by a link 118 to the bars 114. An operating lever 119 is fixed to a shaft 117 to impart the desired movements to the course.

A combined material guide and tamping plate unit C' is provided for this mold and while the function of this unit is similar to that above described, the construction is somewhat different. As shown, the material guide or hopper 120 slides along the upper portion of the bracket 115 and the top of the shell 111. Connected to the forward end of the guide 120 is a tamping plate 121, which is normally held in raised position by a relatively light spring 122. After the material has been fed through the hopper or guide 120, the unit C' is moved to the right (Fig. 8) and the plate 121 is swung downwardly by hand, whereupon the final tamping blow is transmitted to the block F to smooth the outer surface thereof.

The link mechanism 102 and 103 above described, is employed for imparting shifting movement to the unit C'. The link 102 may be detachably connected to the guide 120 in one of several positions to vary the movement thereof to compensate for different size mold blocks. After the block is completely cast, and the final tamping blow delivered thereto, the cores 113 are first removed and thereafter the latches 110b are released, and using the latches as handles the plate 110a is swung to one side against a bracket 123 to enable the cast block F to be removed. Detail description of the mold construction is not deemed necessary since such construction forms no part of the present invention.

It is to be understood that numerous changes in details of construction and operation may be effected without departing from the spirit of the invention, especially as defined in the appended claims.

What I claim is:

1. In a building block machine, material feeding means operable for successively delivering charges of material, automatic means for rendering said feeding means inoperative, adjustable means for regulating the operation of said automatic means for predetermining the amount of material delivered by said feeding means, means for alternately tamping the material delivered by said feeding means, and a unitary manual control to render inoperative either said feeding means or said tamping means without interrupting the operation of the other.

2. In a building block machine, tamping means, material feeding means, means for recurrently operating said tamping means and material feeding means adapted to impart operative movements to said feeding means and subsequently to said tamping means, a single manual control member for selectively rendering both said tamping and feeding means operative or for rendering operative one of said tamping and feeding means independently of the other, a separate manual control member for said feeding means, and adjustable automatic means for rendering said feeding means inoperative after a predetermined amount of material has been delivered thereby.

3. In a building block machine, a hopper, a mold adapted to receive material from said hopper, means to feed material from said hopper, said feeding means comprising a reciprocable feeder, an oscillatable lever for reciprocating said feeder, a detachable operative connection between said lever and feeder, an oscillatable dog connected for actuation to said feeder, a ratchet adapted to be recurrently moved by said dog, an abutment connected for movement with said ratchet, and means engageable by said abutment for detaching said connection thereby to render said feeder inoperative.

4. In a building block machine, a hopper, a mold adapted to receive material from said hopper, means to feed material from said hopper, said feeding means comprising a reciprocable feeder, an oscillatable lever for reciprocating said feeder, a detachable operative connection between said lever and feeder, an oscillatable dog connected for actuation to said feeder, a ratchet adapted to be recurrently moved by said dog, an abutment connected for movement with said ratchet, means engageable by said abutment for detaching said connection thereby to render said feeder inoperative, and a mounting for said ratchet enabling adjustment of said abutment for increasing or diminishing the number of feeding movements of said feeder.

5. In a building block machine, a vertically movable tamp, cam means for recurrently raising said tamp and allowing same to drop by gravity, a latch for holding said tamp in raised position, a crank for actuating said latch, an arm pivoted to said crank, an abutment movable with said cam means and engageable with said arm to release said latch, said arm being normally out of the path of movement of said abutment, and means for moving said arm into the path of movement of said abutment.

6. In a building block machine, a mold-supporting base, a material guide, a finishing tamp plate pivoted to said guide, relatively weak spring means normally holding said plate in inoperative position, said plate being adapted to remain by its own weight in operative position, and a mounting for said material guide for movement transversely of said base.

7. In a building block machine, a vertically movable tamp, cam means for recurrently raising said tamp and allowing same to drop by gravity, a latch for holding said tamp in raised position, a crank for actuating said latch, an arm pivoted to said crank, an abutment movable with said cam means and engageable with said arm to release said latch, material feeding means for delivering material into the path of movement of said tamp, said feeding means comprising a reciprocable feeder, an oscillatable lever for reciprocating said feeder, a common drive for said lever and said cam means, a detachable operative connection between said lever and feeder, an oscillatable dog connected for actuation to said feeder, a ratchet adapted to be recurrently moved by said dog, an abutment connected for movement with said ratchet, means engageable by said abutment for detaching said connection to render said feeder inoperative, and a common control for said detaching means and said first arm thereby to control the operation of said tamp and said feeder.

8. In a building block machine, a vertically movable tamp, cam means for recurrently raising said tamp and allowing same to drop by gravity, a latch for holding said tamp in raised position, means for actuating said latch including a pivoted depending arm, an abutment movable with said cam means and engageable with said arm to release said latch, means for feeding material into the path of movement of said tamp, said feeding means comprising a cam element rotatable with said cam means, a material feeder, a lever for actuating said feeder deriving movement from said cam element, a detachable operative connection between said lever and feeder, and a common control for said tamp and feeder constructed and arranged selectively to actuate said depending lever to operative position and to detach said operative connection.

9. In a building block machine, a vertically movable tamp, cam means for recurrently raising said tamp and allowing same to drop by gravity, a latch for holding said tamp in raised position, means for actuating said latch including a pivoted depending arm, an abutment movable with said cam means and engageable with said arms to release said latch, means for feeding material into the path of movement of said tamp, said feeding means comprising a cam element rotatable with said cam means, a material feeder, a lever for actuating said feeder deriving movement from said cam element, a detachable operative connection between said lever and feeder, and a common control for said tamp and feeder constructed and arranged selectively to actuate said depending lever to operative position and to detach said operative connection, said first abutment being arranged to engage said depending arm and thereby unlatch said tamp after said feeder has delivered a charge of material into the path of said tamp.

10. In a building block machine, a mold box, means for successively feeding aliquot parts of a complete charge of material to said box, means operable simultaneously over substantially the entire top surface of the material in said box to tamp the material in said box after each aliquot part has been delivered thereto, automatic means for rendering said feeding means inoperative, adjustable means for regulating the operation of said automatic means for predetermining the amount of material delivered by said feeding means, and a single manual control for selectively controlling the operation of said feeding means and tamping means.

FRANK X. MUENZER.